US009028080B2

(12) United States Patent
Kudo et al.

(10) Patent No.: US 9,028,080 B2
(45) Date of Patent: May 12, 2015

(54) MIRROR DEVICE FOR VEHICLE

(71) Applicant: Kabushiki Kaisha Tokai-Rika-Denki-Seisakusho, Aichi-ken (JP)

(72) Inventors: Nobuhiro Kudo, Aichi-ken (JP); Masao Ayabe, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 141 days.

(21) Appl. No.: 13/762,705

(22) Filed: Feb. 8, 2013

(65) Prior Publication Data
US 2013/0208373 A1 Aug. 15, 2013

(30) Foreign Application Priority Data

Feb. 13, 2012 (JP) .................................. 2012-028778

(51) Int. Cl.
*G02B 7/182* (2006.01)
*B60R 1/06* (2006.01)

(52) U.S. Cl.
CPC .. *G02B 7/182* (2013.01); *B60R 1/06* (2013.01)

(58) Field of Classification Search
CPC .............. B60R 1/02; B60R 1/04; B60R 1/06; B60R 1/066; B60R 1/072; B60R 1/08; G02B 7/182
USPC ........................... 359/841, 871, 872, 876, 877
See application file for complete search history.

(56) References Cited

U.S. PATENT DOCUMENTS 6,168,279 B1 * 1/2001 Schnell .......................... 359/872
7,645,044 B2   1/2010 Lee

FOREIGN PATENT DOCUMENTS

| CN | 1576104 | 2/2005 |
| CN | 101039820 | 9/2007 |
| DE | 19902756 A1 | 7/2000 |
| JP | H08132964 | 5/1996 |
| JP | 2011-162011 A | 8/2011 |
| WO | 2006040799 A1 | 4/2006 |
| WO | 2006040800 A1 | 4/2006 |

OTHER PUBLICATIONS

Chinese Office Action dated Nov. 3, 2014 and English translation of notice of reasons for rejection.
Japanese Office Action dated Nov. 11, 2015 and English translation of notice of reasons for rejection.

* cited by examiner

*Primary Examiner* — Euncha Cherry
(74) *Attorney, Agent, or Firm* — Roberts Mlotkowski Safran & Cole P.C.

(57) ABSTRACT

Foreign matter is effectively ejected from between a sliding portion and protruding portions. In a mirror surface angle adjustment device of a vehicle door mirror device, while a mirror holder is rotated and an angle of a mirror surface of a mirror is adjusted, a sliding portion of the mirror holder slides on protruding portions of the case. The protruding portions extend to be directed toward a rotating direction of the mirror holder. Therefore, when the sliding portion slides on the protruding portions, foreign matter is easily ejected from between the sliding portion and the protruding portions to sideward of the protruding portions, and foreign matter can be effectively ejected from between the sliding portion and the protruding portions. Therefore, the sliding portion can slide smoothly against the protruding portions, and the rotating of the mirror holder can be made stable.

10 Claims, 7 Drawing Sheets

MIRROR DEVICE FOR VEHICLE

CROSS-REFERENCE TO RELATED APPLICATION

This application claims priority under 35 USC 119 from Japanese Patent Application No. 2012-028778 filed Feb. 13, 2012, the disclosure of which is incorporated by reference herein.

BACKGROUND OF THE INVENTION

1. Field of the Invention

The present invention relates to a mirror device for a vehicle, in which a rotating member at which a mirror is retained is rotated and a mirror surface angle of the mirror is adjusted.

2. Related Art

In a mirror surface angle adjustment device recited in Japanese Patent Application Laid-Open (JP-A) No. 2011-162011, a mirror is retained at a mirror holder, and the mirror holder is rotatably retained in a case. Hence, a mirror surface angle of the mirror is adjusted by the mirror holder being rotated.

A sliding portion is provided at the mirror holder and a rotating surface is provided at the case. When the mirror holder is being rotated, the sliding portion slides on the rotating surface.

In this kind of mirror surface angle adjustment device, it is desirable that, if foreign matter adheres to the sliding portion and/or the rotating surface, the foreign matter can be effectively ejected from between the sliding portion and the rotating surface.

SUMMARY OF THE INVENTION

In consideration of the situation described above, the present invention is to provide a mirror device for a vehicle that can effectively eject foreign matter from between a sliding portion and a protruding portion.

A mirror device for a vehicle according to a first aspect includes: a mirror that is provided at a vehicle; a rotating member at which the mirror is retained; a retaining member at which the rotating member is rotatably retained, the rotating member being rotated to adjust a mirror surface angle of the mirror; a sliding portion that is provided at one of the rotating member or the retaining member; and a protruding portion that is provided protruding from the other of the rotating member or the retaining member, the protruding portion being disposed to be directed toward a rotating direction of the rotating member with respect to a direction orthogonal to the rotating direction of the rotating member, and the sliding portion sliding at the protruding portion when the rotating member is rotated.

In a mirror device for a vehicle according to a second aspect, in the mirror device for a vehicle according to the first aspect, a slide region of the protruding portion, at which the sliding portion slides, is a face region.

In a mirror device for a vehicle according to a third aspect, in the mirror device for a vehicle according to the first aspect or the second aspect, the protruding portion is disposed to be directed toward the direction orthogonal to the rotating direction of the rotating member with respect to the rotating direction of the rotating member.

In a mirror device for a vehicle according to a fourth aspect, in the mirror device for a vehicle according to any one of the first to third aspects, the protruding portion is divided in the rotating direction of the rotating member.

In a mirror device for a vehicle according to a fifth aspect, in the mirror device for a vehicle according to the fourth aspect, a sloped portion is provided at a division portion of the divided protruding portion, a protruding amount of the sloped portion decreasing on progression toward the rotating direction of the rotating member.

In a mirror device for a vehicle according to a sixth aspect, in the mirror device for a vehicle according to the fourth aspect or the fifth aspect, the protruding portion is divided into at least a first protruding portion and a second protruding portion, a division portion of the first protruding portion and a division portion of the second protruding portion are disposed to overlap in the rotating direction of the rotating member, and a width of the division portion of the first protruding portion in the direction orthogonal to the rotating direction of the rotating member decreases on progression toward one side in the rotating direction of the rotating member, and a width of the division portion of the second protruding portion in the direction orthogonal to the rotating direction of the rotating member increases on progression toward the one side in the rotating direction of the rotating member.

It is possible in the mirror device for a vehicle according to the first aspect, a slide region of the protruding portion, at which the sliding portion slides, is a liner region.

It is possible in the mirror device for a vehicle according to the fourth aspect, the protruding portion is divided into at least a first protruding portion and a second protruding portion, a division portion of the first protruding portion and a division portion of the second protruding portion are disposed to overlap in the rotating direction of the rotating member, and a length direction dimension of the first protruding portion increases toward the second protruding portion side in the direction orthogonal to the rotating direction of the rotating member, and a length direction dimension of the second protruding portion increases toward the first protruding portion side in the direction orthogonal to the rotating direction of the rotating member.

It is possible in the mirror device for a vehicle according to the sixth aspect, a total length of the width of the division portion of the first protruding portion in the direction orthogonal to the rotating direction of the rotating member and the width of the division portion of the second protruding portion in the direction orthogonal to the rotating direction of the rotating member is constant in the rotating direction of the rotating member.

In the mirror device for a vehicle according to the first aspect, the mirror provided at the vehicle is retained at the rotating member, and the rotating member is rotatably (pivotably) retained at the retaining member. The rotating member is rotated and the mirror surface angle of the mirror is adjusted.

A sliding portion is provided at one of the rotating member or the retaining member, and protruding portion(s) is (are) provided protruding from the other of the rotating member or the retaining member. When the rotating member is rotated, the sliding portion slides against the protruding portion.

The protruding portion is disposed to be toward the rotating member rotating direction side with respect to the direction orthogonal to the rotating direction of the rotating member. Therefore, foreign matter can be easily ejected (discharged) from between the sliding portion and the protruding portion to sideward of the protruding portion by the sliding portion sliding against the protruding portion, and foreign matter can be effectively ejected from between the sliding portion and the protruding portion.

In the mirror device for a vehicle according to the second aspect, the sliding region of the protruding portion against which the sliding portion slides is a face region. Therefore, abrasion of the sliding portion and the protruding portion due to the sliding portion sliding against the protruding portion can be suppressed, and durability of the sliding portion and the protruding portions can be improved.

In the mirror device for a vehicle according to the third aspect, the protruding portion is disposed to be toward the side of the direction orthogonal to rotating direction of the rotating member with respect to the rotating direction of the rotating member. Therefore, foreign matter can be even more easily ejected from between the sliding portion and the protruding portion to sideward of the protruding portion by the sliding portion sliding against the protruding portion, and foreign matter can be even more effectively ejected from between the sliding portion and the protruding portion.

In the mirror device for a vehicle according to the fourth aspect, the protruding portion is divided in the rotating direction of the rotating member. Therefore, foreign matter can be ejected from between the sliding portion and the protruding portion to the division portion outer side of the protruding portion, and foreign matter can be even more effectively ejected from between the sliding portion and the protruding portion.

In the mirror device for a vehicle according to the fifth aspect, the sloped portion at which protrusion amount of the protruding portion decrease in the rotating direction of the rotating member is provided at the division portion of the divided protruding portion. Therefore, catching of the sliding portion on the division portion of the protruding portion can be suppressed by the sloped portion, and rotating of the rotating member can be made stable.

In the mirror device for a vehicle according to the sixth aspect, the protruding portion is divided into at least a first protruding portion and a second protruding portion, and the division portion of the first protruding portion and a division portion of the second protruding portion are disposed to overlap in the rotating direction of the rotating member, and the width of the division portion of the first protruding portion in the direction orthogonal to the rotating direction of the rotating member decreases on progression toward one side in the rotating direction of the rotating member, and a width of the division portion of the second protruding portion in the direction orthogonal to the rotating direction of the rotating member increases on progression toward the one side in the rotating direction of the rotating member.

Therefore, variations in total resistance to the sliding portion sliding against the division portion of the first protruding portion and the division portion of the second protruding portion of the protruding portion can be suppressed, and the rotating of the rotating member can be made stable.

BRIEF DESCRIPTION OF THE DRAWINGS

Embodiments of the invention will be described in detail with reference to the following figures, wherein.

DETAILED DESCRIPTION OF THE INVENTION

Figure 1:
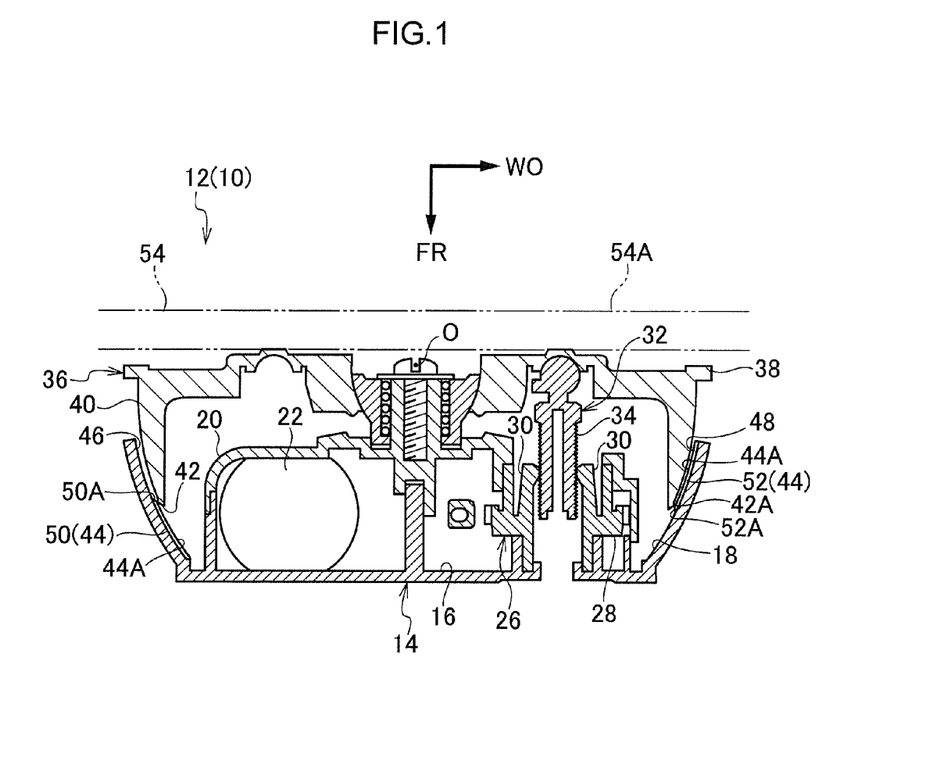
FIG. 1 is a sectional diagram, viewed from downward, showing a mirror surface adjustment device of a vehicle door mirror device in accordance with an exemplary embodiment of the present invention.
Figure 2:
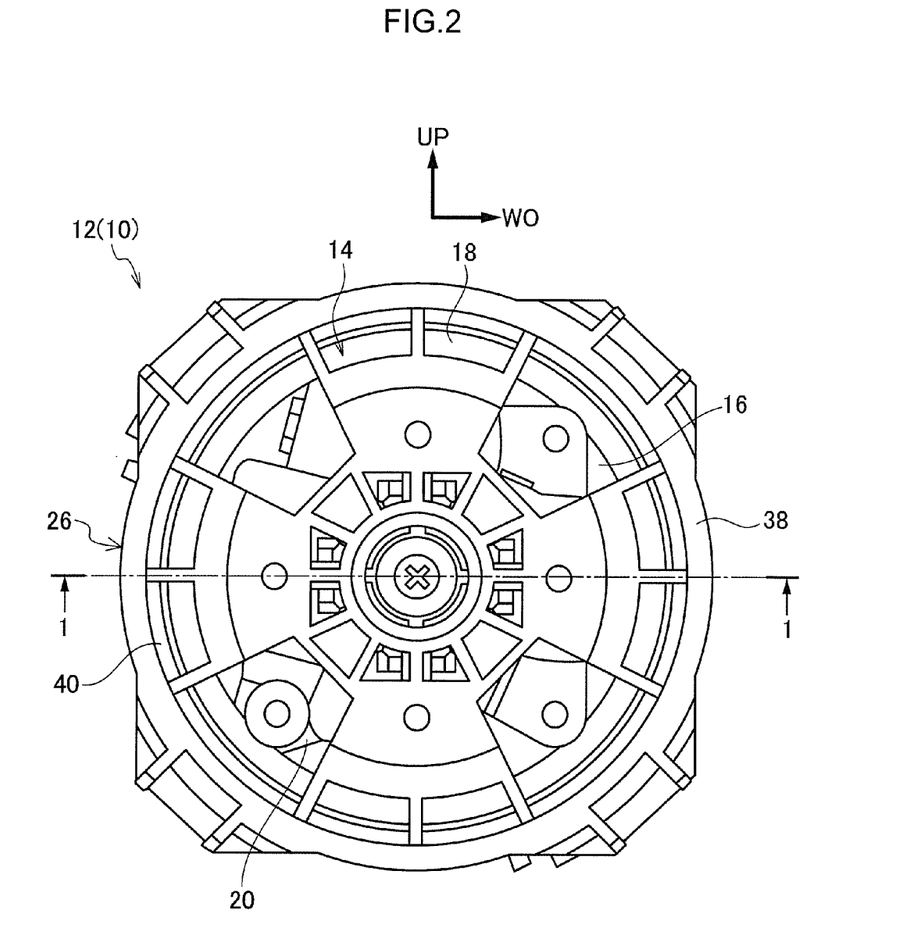
FIG. 2 is a front diagram, viewed from a vehicle rearward side, showing the mirror surface adjustment device of the vehicle door mirror device in accordance with the exemplary embodiment of the present invention.
Figure 3:
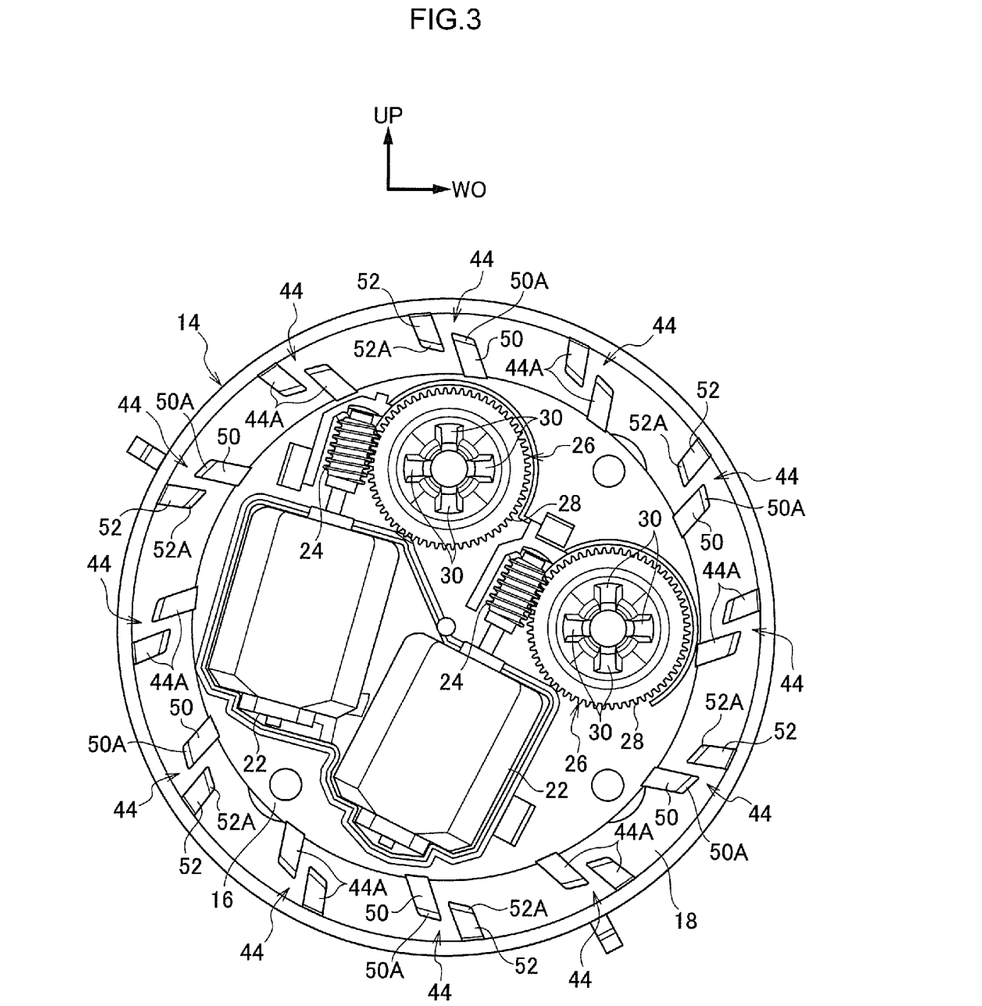
FIG. 3 is a front diagram, viewed from the vehicle rearward side, showing a case and suchlike of the mirror surface adjustment device of the vehicle door mirror device in accordance with the exemplary embodiment of the present invention.

FIG. 1 shows principal portions of a vehicle door mirror device 10 according to an exemplary embodiment employing the mirror device for a vehicle of the present invention, in a sectional diagram viewed from downward. FIG. 2 shows the principal portions of the vehicle door mirror device 10 in an elevation diagram viewed from a vehicle rearward side. FIG. 3 shows a portion of the principal portions of the vehicle door mirror device 10 in an elevation diagram viewed from the vehicle rearward side. In the drawings, the vehicle forward side is indicated by the arrow FR, one way in the vehicle width direction is indicated by the arrow WO, and upward is indicated by the arrow UP.

The vehicle door mirror device 10 according to the present exemplary embodiment is disposed at a door of the vehicle, and a mirror surface angle adjustment device 12 is provided at an interior portion of the vehicle door mirror device 10.

As shown in FIG. 1 to FIG. 3, the mirror surface angle adjustment device 12 is provided with a substantially hemispherical container shaped case 14, which serves as a main body portion structuring a retaining member. The case 14 is fixed at the interior portion of the vehicle door mirror device 10. A vehicle rear side face of the case 14 is open. A vehicle front side face at the inner periphery side of the case 14 is formed as a circular bottom surface 16. A vehicle rear side face at the inner periphery side of the case 14 is formed as an annular disposition surface 18. The disposition surface 18 is curved into a spherical surface shape, which is centered on a rotating center O of a mirror holder 36 which is described below.

A container shaped case inner 20 is fixed to the bottom surface 16 of the case 14. The case inner 20 serves as a fixing portion structuring the retaining member. A vehicle front side face of the case inner 20 is opened.

A pair of motors 22 that serve as a driving unit are provided at the bottom surface 16 of the case 14. The pair of motors 22 are fixed to the interior of the case inner 20. Output shafts of the motors 22 extend outside the case inner 20, and worms 24 are fixed to the output shafts of the motors 22.

A pair of substantially tubular wheel drives 26 that serve as linking (communicating) members are rotatably supported at the bottom surface 16 of the case 14. Worm wheels 28 are formed at the wheel drives 26, and the worm wheels 28 mesh (engage) with the worms 24 of the motors 22. Thus, when the motors 22 are driven and the worms 24 are rotated, the worm wheels 28 are rotated and the wheel drives 26 are rotated.

A predetermined number (four in the present exemplary embodiment) of meshing pawls 30 that serve as engaging portions are integrally formed at each wheel drive 26. The predetermined number of meshing pawls 30 are disposed to be equidistant in the circumferential direction of the wheel drive 26. The meshing pawls 30 extend from the wheel drive 26 to the vehicle rear side, and are resilient (elastic member). Distal ends (vehicle rear side ends) of the meshing pawls 30 protrude to the inner side in the radial direction of the wheel drive 26.

A substantially circular rod-shaped rod drive 32, which serves as a driving member, is inserted into the wheel drive 26, and rotating of the rod drive 32 about a central axis is restricted. The pair of rod drives 32 are disposed at the inner periphery side of the disposition surface 18 of the case 14. One of the wheel drives 26 is disposed above or below a central axis of the disposition surface 18, and the other of the wheel drives 26 is disposed to be at one side or the other side in the vehicle width direction relative to the central axis of the disposition surface 18.

A portion of each rod drive 32 excluding a distal end portion (vehicle rear side end portion) thereof is formed as a screw 34. The distal ends of the meshing pawls 30 of the wheel drive 26 are meshed (engaged) with the screw 34. Therefore, when the motors 22 are driven and each wheel drive 26 (including the meshing pawls 30) is rotated as mentioned above, a position of meshing between the distal ends of the meshing pawls 30 and the screw 34 is displaced, and the rod drive 32 is moved in the vehicle front and rear direction.

The mirror holder 36, which serves as a rotating member, is provided at the vehicle rear side of the case 14. A substantially circular plate-shaped holder portion 38 is formed at the mirror holder 36. At the center of the holder portion 38, the mirror holder 36 is retained at the case inner 20 to be rotatably (pivotably) about the rotating center O.

Distal end portions (vehicle rear side end portions) of the rod drives 32 rotatably retain the holder portion 38 of the mirror holder 36. When the motors 22 are driven and each rod drive 32 is moved in the vehicle front and rear direction as mentioned above, the mirror holder 36 is driven to rotate.

A rotating wall 40 with a substantially hemispheric wall shape is integrally formed at the vehicle front side face of the holder portion 38. The vehicle front side face of the rotating wall 40 is open. The rotating wall 40 is disposed at the inner periphery side of the disposition surface 18 of the case 14. An outer periphery face and an inner periphery face of the rotating wall 40 are curved into spherical surface shapes centered on the rotating center O of the mirror holder 36.

Figure 4:
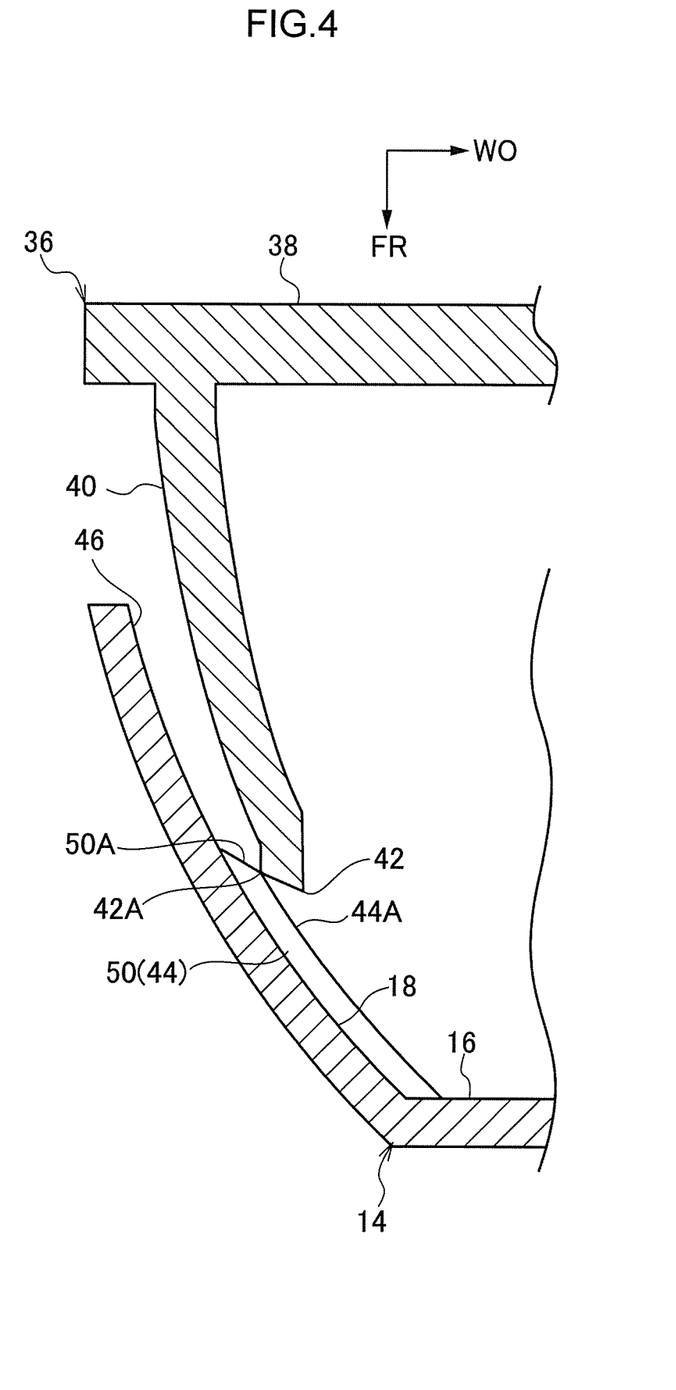
FIG. 4 is a sectional diagram, viewed from downward, showing principal portions of the mirror surface adjustment device of the vehicle door mirror device in accordance with the exemplary embodiment of the present invention.

As is shown in detail in FIG. 4, a sliding portion 42 which has a rectangular shape in cross-section is integrally formed along the whole periphery of the vehicle front side end of the rotating wall 40. The sliding portion 42 protrudes toward the vehicle front side and the radial direction outer side. An outer periphery face and an inner periphery face of the sliding portion 42 are formed as circular periphery surfaces centered on a central axis of the rotating wall 40. A vehicle front side face of the sliding portion 42 is angled (tilted) in a direction inclining to the vehicle front side toward the radial direction inner side of the sliding portion 42. A corner portion between the outer periphery face and the vehicle front side face of the sliding portion 42 is a sliding part 42A.

As shown in FIG. 1 and FIG. 3, a predetermined number (twelve in the present exemplary embodiment) of protruding portions 44 which have rectangular shapes in cross section are protrudingly formed at the disposition surface 18 of the case 14. The predetermined number of protruding portions 44 are disposed so as to be equal distance therebetween in a circumferential direction around the central axis of the disposition surface 18 (which direction is a rotation orthogonal direction of the mirror holder 36 (orthogonal direction to the rotation direction of the mirror holder 36), and is hereinafter referred to as "lateral circumference direction of the disposition surface 18"). Each protruding portion 44 extends substantially along a circumferential direction of radii (arc) that is centered on the rotating center O of the mirror holder 36 and that the central axis of the disposition surface 18 passes (which direction is the rotation direction of the mirror holder 36, and is hereinafter referred to as "longitudinal circumference direction of the disposition surface 18"). (Each protruding portion 44 is disposed to be directed toward the disposition surface 18 longitudinal circumference direction side with respect to the disposition surface 18 lateral circumference direction, and disposed to be directed toward the disposition surface 18 lateral circumference direction side with respect to the disposition surface 18 longitudinal circumference direction.) Each protruding portion 44 is provided at the disposition surface 18 so as to be across the whole of the longitudinal circumference direction of the disposition surface 18, and two (both) edges of the protruding portion 44 in the disposition surface 18 lateral circumference direction sides thereof are provided in parallel with one another. The areas of portions of the disposition surface 18 at which the protruding portions 44 are formed are smaller than the areas of portions of the disposition surface 18 at which the protruding portions 44 are not formed.

Each protrusion end face of the protruding portion 44 is formed as a contact surface 44A (a sliding region), and is curved into a spherical surface shape centered on the rotating center O of the mirror holder 36. An amount of protrusion of each contact surface 44A of the protruding portions 44 is, for example, more than or equal to 0.2 mm and less than or equal to 0.3 mm. The sliding part 42A of the sliding portion 42 of the mirror holder 36 contacts against (press-contacts against) the contact surfaces 44A. When the mirror holder 36 is rotated, the sliding part 42A slides on the contact surfaces 44A. The curvature of the sliding part 42A (the curvature of the cross-section of a plane surface which the central axis of the disposition surface 18 of the case 14 passes) is larger than the curvature of each contact surface 44A. Thus, the sliding part 42A makes linear contact with each contact surface 44A. The sliding part 42A of the sliding portion 42 that touches against the contact surfaces 44A may be a corner portion between the inner periphery face and vehicle front side face of the sliding portion 42, a part or all of the vehicle front side face of the sliding portion 42, or the like.

A gap 46 is formed between the rotating wall 40 and the disposition surface 18 (except for the protruding portions 44), over the whole area relative to the sliding part 42A to the vehicle rear side (the side at which the holder portion 38 of the mirror holder 36 is disposed). A radial direction dimension of the gap 46 is constant except between the outer periphery face of the sliding portion 42 and the disposition surface 18. Between the rotating wall 40 and the contact surface 44A of each protruding portion 44, a gap 48 is formed over the whole area to the vehicle rear side relative to the sliding part 42A. A radial direction dimension of the gap 48 is constant except between the outer periphery face of the sliding portion 42 and the contact surfaces 44A. The area of the contact surface 44A against which the sliding part 42A slides is larger than the area of the sliding part 42A.

A lubricating agent (grease) is applied to the disposition surface 18 (including the protruding portions 44) and the rotating wall 40 (including the sliding portion 42). Sliding resistance between the sliding part 42A and the contact surface 44A is reduced by the lubricating agent.

Figure 5:
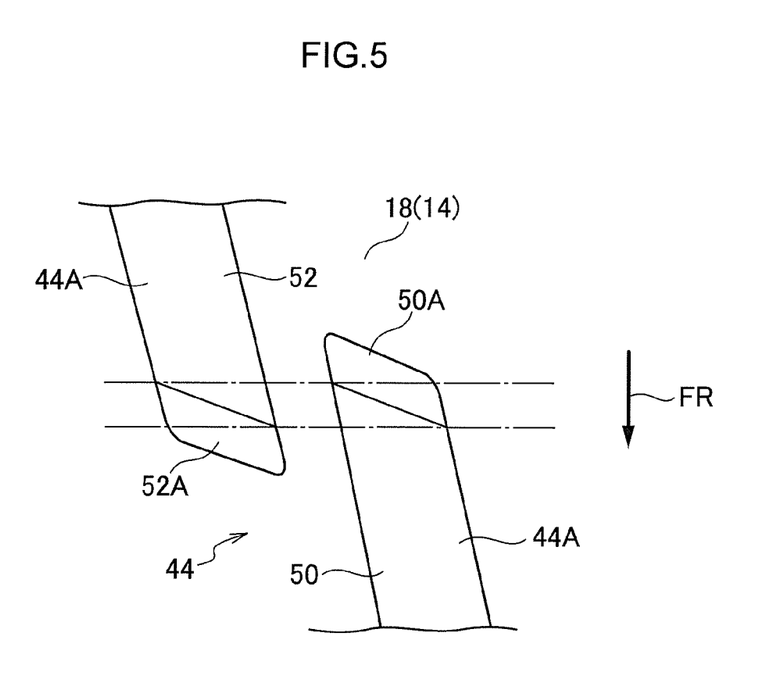
FIG. 5 is a front diagram showing the principal portions of the mirror surface adjustment device of the vehicle door mirror device in accordance with the exemplary embodiment of the present invention.

As shown in detail in FIG. 5, each protruding portion 44 is divided, at the middle (center) in the disposition surface 18 longitudinal circumference direction, into a front protruding portion 50 that serves as a first protruding portion which is at the vehicle front side and a rear protruding portion 52 that serves as a second protruding portion which is at the vehicle rear side. The front protruding portion 50 and the rear protruding portion 52 are separated from one another in the disposition surface 18 lateral circumference direction. A separation distance between the front protruding portion 50 and the rear protruding portion 52 in the disposition surface 18 lateral circumference direction is smaller than a separation distance between the adjacent protruding portions 44 in the vehicle lateral circumference direction. A vehicle rear side end portion of the front protruding portion 50 (a division portion, which is a region of the front protruding portion 50 at the rear protruding portion 52 side thereof) and a vehicle front side end portion of the rear protruding portion 52 (a division portion, which is a region of the rear protruding portion 52 at the front protruding portion 50 side thereof) are disposed to so as to be superposed (overlapped) in the disposition surface 18 longitudinal circumference direction.

The vehicle rear side edge of the contact surface 44A of the front protruding portion 50 is angled (inclined) in a direction such that it goes toward the vehicle rear side as it goes toward the rear protruding portion 52 side. At the vehicle rear side end portion of the front protruding portion 50, the width of the contact surface 44A in the disposition surface 18 lateral circumference direction decreases on progression toward the vehicle rear side. The vehicle front side edge of the contact surface 44A of the rear protruding portion 52 is angled (inclined) in a direction such that it goes toward the vehicle front side as it goes toward the front protruding portion 50 side. At the vehicle front side end portion of the rear protruding portion 52, the width of the contact surface 44A in the disposition surface 18 lateral circumference direction decreases on progression toward the vehicle front side.

The position of a vehicle front side end of the vehicle rear side edge of the contact surface 44A of the front protruding portion 50 and the position of a vehicle front side end of the vehicle front side edge of the contact surface 44A of the rear protruding portion 52 coincide in the disposition surface 18 longitudinal circumference direction. The position of a vehicle rear side end of the vehicle rear side edge of the contact surface 44A of the front protruding portion 50 and the position of a vehicle rear side end of the vehicle front side edge of the contact surface 44A of the rear protruding portion 52 also coincide in the disposition surface 18 longitudinal circumference direction. Consequently, a total length dimension in the disposition surface 18 lateral circumference direction of the contact surfaces 44A of the protruding portion 44 (of one/both of the front protruding portion 50 and the rear protruding portion 52) is constant anywhere in the disposition surface 18 longitudinal circumference direction, including at the division portions of the front protruding portion 50 and rear protruding portion 52 of the protruding portion 44.

A vehicle rear side end face of the front protruding portion 50 is a front sloped face 50A, which serves as a sloped portion. The front sloped face 50A is sloped (slant) in a direction such that the protrusion amount of the front protruding portion 50 decreases on progression toward the vehicle rear side (and the front sloped face 50A may be curved in a convex shape or a concave shape). A vehicle front side end face of the rear protruding portion 52 is a rear sloped face 52A, which serves as a slant portion. The rear sloped face 52A is sloped (slant) in a direction such that the protrusion amount of the rear protruding portion 52 decreases on progression toward the vehicle front side (and the rear sloped face 52A may be curved in a convex shape or a concave shape).

As shown in FIG. 1, a mirror 54 is retained at the holder portion 38 of the mirror holder 36, at the vehicle rear side thereof. The mirror 54 is made pivotable (rotatable) integrally with the mirror holder 36. A vehicle rear side face of the mirror 54 is formed as a mirror surface 54A. An occupant of the vehicle may see to the vehicle rear side by means of the mirror 54.

Next, operation of the present exemplary embodiment is described.

In the vehicle door mirror device 10 with the structure described above, the motors 22 of the mirror surface angle adjustment device 12 are driven and the worm gears 24 are rotated. Thus, the wheel drives 26 (including the worm wheels 28 and the predetermined numbers of the meshing pawls 30) are rotated, and the rod drives 32 are moved in the vehicle front and rear direction. Accordingly, the mirror holder 36 and the mirror 54 are driven by the rod drives 32, and the mirror holder 36 and mirror 54 are rotated in one or both of the up and down direction and the vehicle width direction about the rotating center O. Thus, the angle of the mirror surface 54A of the mirror 54 is adjusted in one or both of the up and down direction and the vehicle width direction.

When the mirror holder 36 is being rotated, the sliding portion 42 (the sliding part 42A) of the rotating wall 40 of the mirror holder 36 slides against the protruding portions 44 (the contact surfaces 44A) of the disposition surface 18 of the case 14.

The length direction of each protruding portion 44 extends to be toward the disposition surface 18 longitudinal circumference direction side with respect to the disposition surface 18 lateral circumference direction. Therefore, when the sliding portion 42 slides against the protruding portion 44, foreign matter (particularly dust adhering to the lubricating agent and the like) can be easily ejected (discharged) from between the sliding portion 42 and the protruding portion 44 to sideward in the disposition surface 18 lateral circumference direction of the protruding portion 44. Thus, foreign matter can be effectively ejected from between the sliding portion 42 and the protruding portions 44.

The length direction of each protruding portion 44 also extends to be toward the disposition surface 18 lateral circumference direction side with respect to the disposition surface 18 longitudinal circumference direction, and both edges at the disposition surface 18 lateral circumference direction sides of the protruding portion 44 extend to be toward the disposition surface 18 lateral circumference direction side with respect to the disposition surface 18 longitudinal circumference direction. Therefore, when the sliding portion 42 slides over the disposition surface 18 lateral circumference direction side edge of the protruding portion 44, foreign matter can be even more easily ejected from between the sliding portion 42 and the protruding portion 44 to sideward in the disposition surface 18 lateral circumference direction of the protruding portion 44. Thus, foreign matter can be even more effectively ejected from between the sliding portion 42 and the protruding portions 44.

Moreover, each protruding portion 44 is divided in the disposition surface 18 longitudinal circumference direction into the front protruding portion 50 and the rear protruding portion 52. Therefore, when the sliding portion 42 slides against the protruding portion 44, foreign matter can be ejected from between the sliding portion 42 and the protruding portion 44 to the outer side of the vehicle rear side end portion of the front protruding portion 50 and the outer side of the vehicle front side end portion of the rear protruding portion 52. Thus, foreign matter can be even more effectively ejected from between the sliding portion 42 and the protruding portions 44.

According to the above, when the sliding portion 42 is sliding against the protruding portions 44, conveyance of foreign matter over the protruding portion 44 by the sliding portion 42 is suppressed, and the introduction of foreign matter between the sliding part 42A and the protruding portion 44 is suppressed. Thus, the sliding portion 42 slides smoothly against the protruding portions 44, and rotating of the mirror holder 36 can be made stable.

Furthermore, the area of portions of the disposition surface 18 at which the protruding portions 44 are not formed is larger than the area of portions of the disposition surface 18 at which the protruding portions 44 are formed. Therefore, clogging of the regions of the disposition surface 18 at which the protruding portions 44 are not formed, with the foreign matter that is ejected to sideward in the disposition surface 18 lateral circumference direction of the protruding portions 44 as described above, can be suppressed, and obstruction of rotating of the mirror holder 36 by this foreign matter can be suppressed. Thus, the rotating of the mirror holder 36 can be made even more stable.

As described above, the length direction of each protruding portion 44 extends to be toward the disposition surface 18 lateral circumference direction side from the disposition surface 18 longitudinal circumference direction. Therefore, by the sliding portion 42 sliding against the protruding portion 44, the sliding position of the sliding portion 42 with respect to the protruding portion 44 can be displaced in the disposition surface 18 lateral circumference direction. Thus, abrasion of the sliding portion 42 due to the sliding portion 42 sliding against the protruding portion 44 can be suppressed, and durability of the mirror holder 36 can be improved.

The contact surface 44A of each protruding portion 44 is formed in a spherical surface shape centered on the rotating center O of the mirror holder 36. Therefore, abrasion of the sliding portion 42 and the protruding portions 44 due to the sliding portion 42 sliding against the protruding portions 44 can be suppressed, and durability of the mirror holder 36 and the case 14 can be improved.

The vehicle rear side end portion of the front protruding portion 50 and the vehicle front side end portion of the rear protruding portion 52 are disposed to overlap in the disposition surface 18 longitudinal circumference direction. Therefore, the sliding portion 42 can slide against the vehicle rear side end portion of the front protruding portion 50 and the vehicle front side end portion of the rear protruding portion 52 simultaneously, and rotating of the mirror holder 36 can be made even more stable.

The disposition surface 18 lateral circumference direction width of the contact surface 44A at the vehicle rear side end portion of each front protruding portion 50 decreases toward the vehicle rear side, and the disposition surface 18 lateral circumference direction width of the contact surface 44A at the vehicle front side end portion of each rear protruding portion 52 decreases toward the vehicle front side. Thus, The total length dimension of the disposition surface 18 lateral circumference direction width of the contact surface 44A at the vehicle rear side end portion of each front protruding portion 50 and the disposition surface 18 lateral circumference direction width of the contact surface 44A at the vehicle front side end portion of each rear protruding portion 52 is constant anywhere in the disposition surface 18 longitudinal circumference direction. In other words, the total length dimension of the contact surface(s) 44A of the protruding portion 44 (one/both of the front protruding portion 50 and the rear protruding portion 52) in the disposition surface 18 lateral circumference direction is constant anywhere in the disposition surface 18 longitudinal circumference direction. Therefore, when the sliding portion 42 is sliding against the protruding portions 44, even when the sliding portion 42 is sliding against the vehicle rear side end portion of the front protruding portion 50 and the vehicle front side end portion of the rear protruding portion 52, the total sliding resistance of the sliding portion 42 against each protruding portion 44 (one/both of the front protruding portion 50 and the rear protruding portion 52) is constant everywhere. Thus, the rotating of the mirror holder 36 can be made even more consistent.

The front sloped face 50A, which is the vehicle rear side end face of the front protruding portion 50, is sloped in the direction such that the protrusion amount of the front protruding portion 50 decreases toward the vehicle rear side, and the rear sloped face 52A, which is the vehicle front side end face of the rear protruding portion 52, is sloped in the direction such that the protrusion amount of the rear protruding portion 52 decreases toward the vehicle front side. Therefore, when the sliding portion 42 is sliding against the vehicle rear side end portion of the front protruding portion 50 and the vehicle front side end portion of the rear protruding portion 52, catching of the sliding portion 42 on the vehicle rear side end portion of the front protruding portion 50 can be suppressed by the front sloped face 50A, and catching of the sliding portion 42 on the vehicle front side end portion of the rear protruding portion 52 can be suppressed by the rear sloped face 52A. Thus, the rotating of the mirror holder 36 can be made even more stable.

The length direction dimension of the contact surface 44A of each front protruding portion 50 increases toward the rear protruding portion 52 side in the disposition surface 18 lateral circumference direction, and the length direction dimension of the contact surface 44A of each rear protruding portion 52 increases toward the front protruding portion 50 side in the disposition surface 18 lateral circumference direction. Therefore, the sliding portion 42 can slide against the vehicle rear side end portion of the front protruding portion 50 and the vehicle front side end portion of the rear protruding portion 52 at positions that are close in the disposition surface 18 lateral circumference direction, and the sliding portion 42 can be supported stably by the vehicle rear side end portion of the front protruding portion 50 and the vehicle front side end portion of the rear protruding portion 52. Thus, the rotating of the mirror holder 36 can be made even more stable.

In the present exemplary embodiment, the protruding portions 44 (contact surfaces 44A) extend substantially along the disposition surface 18 longitudinal circumference direction. However, the protruding portions 44 (contact surfaces 44A) may extend directly along the disposition surface 18 longitudinal circumference direction.

In the present exemplary embodiment, the two edges at the disposition surface 18 lateral circumference direction sides of each protruding portion 44 (contact surface 44A), extend to be inclined toward the disposition surface 18 lateral circumference direction side with respect to the disposition surface 18 longitudinal circumference direction. However, it is sufficient that at least one of the edges at the disposition surface 18 lateral circumference direction sides of the protruding portion 44 (contact surface 44A) extends to be inclined toward the disposition surface 18 lateral circumference direction side with respect to the disposition surface 18 longitudinal circumference direction.

In the present exemplary embodiment, each protruding portion 44 is divided into two parts in the disposition surface 18 longitudinal circumference direction. However, each protruding portion 44 need not be divided in the disposition surface 18 longitudinal circumference direction. Further, each protruding portion 44 may be divided into three or more parts in the disposition surface 18 longitudinal circumference direction.

Figure 6:
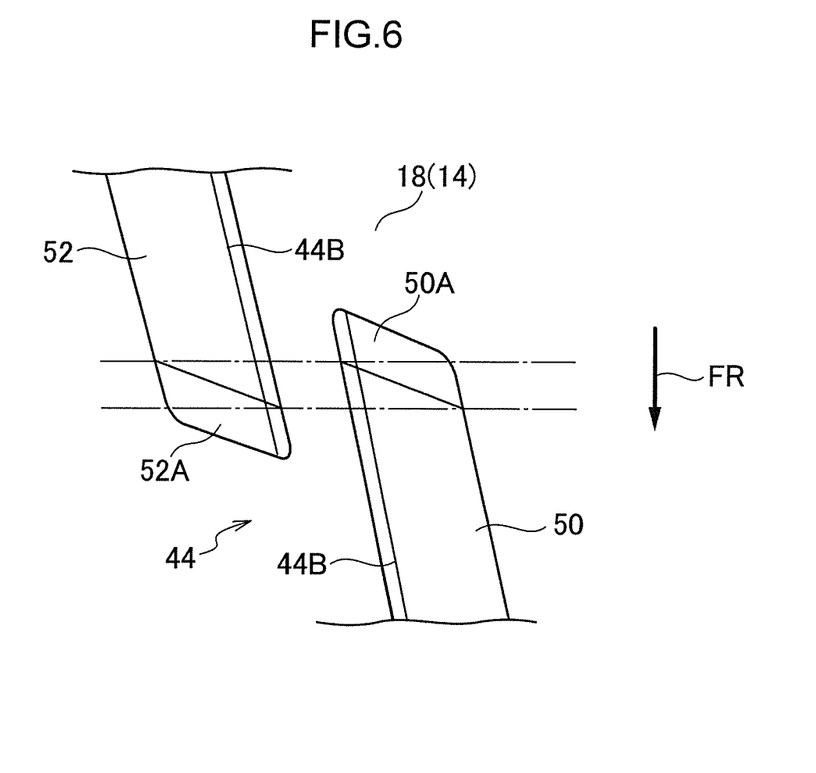
FIG. 6 is a front diagram showing the modified principal portions of the mirror surface adjustment device of the vehicle door mirror device in accordance with the exemplary embodiment of the present invention.

In the present exemplary embodiment, each protruding portion 44 has a rectangular shape in cross section, and a contact portion of the protruding portion 44 against which the sliding portion 42 slides is a face shaped contact surface 44A. However, as illustrated in FIG. 6, each protruding portion 44 may have, for example, a triangular shape in cross section, and the contact portion of the protruding portion 44 against which the sliding portion 42 slides may be a linear contact line 44B. In this case, it is more preferable for the contact line 44B of the front protruding portion 50 to be disposed closer to the rear protruding portion 52 side in the disposition surface 18 lateral circumference direction, and it is more preferable for the contact line 44B of the rear protruding portion 52 to be disposed closer to the front protruding portion 50 side in the disposition surface 18 lateral circumference direction. Accordingly, the sliding portion 42 can slide at positions of the contact line 44B of the front protruding portion 50 and the contact line 44B of the rear protruding portion 52 that are disposed close to one another in the disposition surface 18 lateral circumference direction. Thus, the sliding portion 42 can be stably supported by the front protruding portion 50 and the rear protruding portion 52.

The present exemplary embodiment has a structure in which the rotating wall 40 of the mirror holder 36 is in a substantially hemispheric wall shape, and the outer periphery face and inner periphery face of the rotating wall 40 have spherical surface shapes. However, it is sufficient if the rotating wall 40 has a shape at which the sliding portion 42 is specified. For example, a structure is applicable in which the rotating wall 40 is in a tubular shape or the like and one or both of an outer periphery face and an inner periphery face of the rotating wall 40 has a circular periphery surface shape.

Figure 7A:
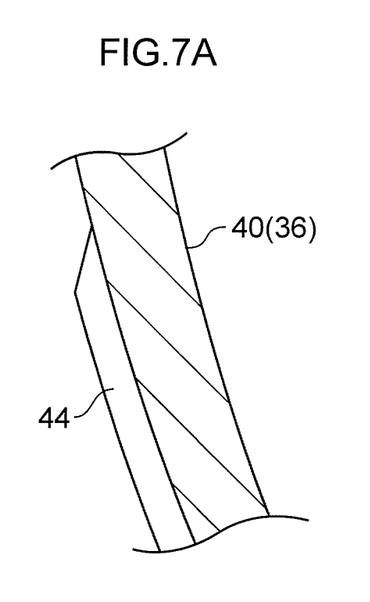
FIGS. 7A and 7B are sectional diagrams, viewed from downward, showing the modified principal portions of the mirror surface adjustment device of the vehicle door mirror device in accordance with the exemplary embodiment of the present invention.
Figure 7B:
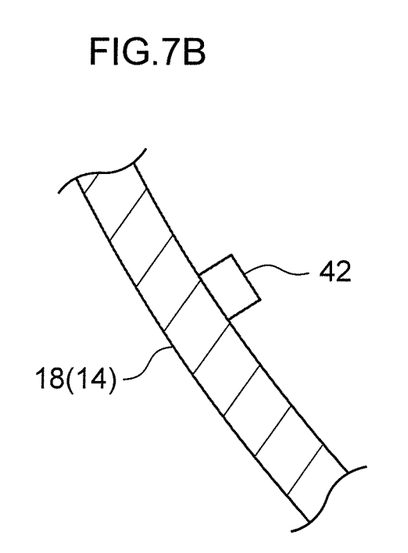

In the present exemplary embodiment, the protruding portions 44 are provided at the case 14 and the sliding portion 42 is provided at the mirror holder 36. However, the sliding portion 42 may be provided at the case 14 and the protruding portions 44 provided at the mirror holder 36 (FIGS. 7A and 7B).

The present exemplary embodiment has a structure in which the present invention is applied to the vehicle door mirror device 10. However, structures in which the present invention is applied to other mirror devices outside and inside vehicles and the like are also applicable.

What is claimed is:

1. A mirror device for a vehicle, comprising:
   a mirror that is provided at a vehicle; a rotating member at which the mirror is retained;
   a retaining member at which the rotating member is rotatably retained at an inner surface of the retaining member, the rotating member being rotated to adjust a mirror surface angle of the mirror;
   a sliding portion that is provided at one of the rotating member or the retaining member; and
   a plurality of protruding portions that is are provided protruding from the other of the rotating member or the retaining member, the protruding portions being disposed such that a longitudinal direction, which is an extending direction, of the protruding portions are inclined toward a rotating direction of the rotating member with respect to a direction orthogonal to the rotating direction of the rotating member, and the sliding portion sliding at the protruding portion when the rotating member is rotated,
   the rotating direction being a direction along a circumferential direction of an arc which is centered on a rotating center of the rotating member and at which a central axis of the inner surface crosses, and
   the direction orthogonal to the rotating direction being a direction along a circumferential direction of an arc which is centered on the central axis and which is orthogonal to the rotating direction,
   wherein the protruding portions are divided in the rotating direction of the rotating member.

2. The mirror device for a vehicle of claim 1, wherein a slide region of the protruding portion, at which the sliding portion slides, is a face region.

3. The mirror device for a vehicle of claim 1, wherein the protruding portion is disposed to be directed toward the direction orthogonal to the rotating direction of the rotating member with respect to the rotating direction of the rotating member.

4. The mirror device for a vehicle of claim 1, wherein a sloped portion is provided at a division portion of the divided protruding portion, a protruding amount of the sloped portion decreasing on progression toward the rotating direction of the rotating member.

5. The mirror device for a vehicle of claim 1, wherein the protruding portion is divided into at least a first protruding portion and a second protruding portion, a division portion of the first protruding portion and a division portion of the second protruding portion are disposed to overlap in the rotating direction of the rotating member, and a width of the division portion of the first protruding portion in the direction orthogonal to the rotating direction of the rotating member decreases on progression toward one side in the rotating direction of the rotating member, and a width of the division portion of the second protruding portion in the direction orthogonal to the rotating direction of the rotating member increases on progression toward the one side in the rotating direction of the rotating member.

6. The mirror device for a vehicle of claim 4, wherein
   the protruding portion is divided into at least a first protruding portion and a second protruding portion, a division portion of the first protruding portion and a division portion of the second protruding portion are disposed to overlap in the rotating direction of the rotating member, and a width of the division portion of the first protruding portion in the direction orthogonal to the rotating direction of the rotating member decreases on progression toward one side in the rotating direction of the rotating member, and a width of the division portion of the second protruding portion in the direction orthogonal to the rotating direction of the rotating member increases on progression toward the one side in the rotating direction of the rotating member.

7. The mirror device for a vehicle of claim 1, wherein a slide region of the protruding portion, at which the sliding portion slides, is a liner region.

8. The mirror device for a vehicle of claim 1, wherein
   the protruding portion is divided into at least a first protruding portion and a second protruding portion, a division portion of the first protruding portion and a division portion of the second protruding portion are disposed to overlap in the rotating direction of the rotating member, and a length direction dimension of the first protruding portion increases toward the second protruding portion side in the direction orthogonal to the rotating direction of the rotating member, and a length direction dimension of the second protruding portion increases toward the first protruding portion side in the direction orthogonal to the rotating direction of the rotating member.

9. The mirror device for a vehicle of claim 5, wherein a total length of the width of the division portion of the first protruding portion in the direction orthogonal to the rotating direction of the rotating member and the width of the division portion of the second protruding portion in the direction orthogonal to the rotating direction of the rotating member is constant in the rotating direction of the rotating member.

10. The mirror device for a vehicle of claim 1, wherein the plurality of protruding portions are arranged in the direction orthogonal to the rotating direction with intervals therebetween.

* * * * *